(12) United States Patent
Kurozasa

(10) Patent No.: US 6,614,546 B1
(45) Date of Patent: *Sep. 2, 2003

(54) IMAGE PROCESSING SYSTEM AND IMAGE FORMING APPARATUS

(75) Inventor: Yoshiharu Kurozasa, Yokohama (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,600

(22) Filed: Mar. 10, 1998

(30) Foreign Application Priority Data

Mar. 10, 1997 (JP) .............................. 9-070873

(51) Int. Cl.⁷ .............................. G06F 13/00
(52) U.S. Cl. .................... 358/1.15; 358/1.13; 358/1.16; 358/434
(58) Field of Search .......................... 395/114; 358/442, 358/468, 1.15, 1.16, 1.13, 1.2, 1.1, 434, 440, 444; H04N 1/32

(56) References Cited

U.S. PATENT DOCUMENTS

| | | | | |
|---|---|---|---|---|
| 5,247,623 A | * | 9/1993 | Sun | 395/325 |
| 5,303,336 A | * | 4/1994 | Kageyama et al. | 395/114 |
| 5,570,201 A | * | 10/1996 | Yokota | 358/468 |
| 5,602,973 A | * | 2/1997 | Nishiwaki | 395/113 |
| 5,623,675 A | * | 4/1997 | Mizuki | 395/733 |
| 5,767,985 A | * | 6/1998 | Yamamoto | 358/402 |
| 5,907,410 A | * | 5/1999 | Ohtake | 395/114 |
| 5,937,148 A | * | 8/1999 | Okazawa | 395/112 |

FOREIGN PATENT DOCUMENTS

JP 7-28612 1/1995

* cited by examiner

Primary Examiner—Mark Wallerson
(74) Attorney, Agent, or Firm—Morrison & Foerster LLP

(57) ABSTRACT

An image processing system and method where a printer receives a print request from a printer driver which is not exclusively used for the printer. Before the printer starts printing in accordance with the print request, print mode items such as the size of a print sheet, the number of pages and a paper tray to be used, set by the printer driver, can be changed. Additional print mode setting characteristics of the printer such as execution/non-execution of sorting, execution/non-execution of stapling and execution/non-execution of punching, which cannot be made by the printer driver, can be made, from an operation panel of the printer or a printer server, without changing the position of the print job in the printing order. In a network, a digital copying machine (printer) receives a print job from on of multiple client computers connected to the network via a printer server. The print job is stored in the digital copying machine or a memory of the printer server, and managed with a job management table of the memory. An operator can change and/or perform addition with respect to a print mode by rewriting the job management table from an operation panel or the like.

21 Claims, 21 Drawing Sheets

```
JOB LIST

No. Title         Status    Pages  Copies  Tray    1/2-Side  Sort  Staple
1.  Print Job #1  Printing  10     3       Auto    1         On    On
2.  Copy Job #1   Waiting   5      1       Auto    2         Off   Off
3.  Print Job #2  Waiting   1      2       Bypass  1         Off   Off
4.  Print Job #3  Waiting   3      2       Bypass  2         On    On
    ***           ***       ***    ***     ***     ***       ***   ***
```

| PAPER FEED PORT | SIZE / DIRECTION | EXISTENT / ABSENT | SHEET TYPE |
|---|---|---|---|
| FIRST FEED PORT | A4 LANDSCAPE | EXISTENT | — |
| SECOND FEED PORT | A3 PORTRAIT | EXISTENT | — |
| MANUAL FEED PORT | A4 LANDSCAPE | ABSENT | NORMAL |

Fig. 17

| | JOB ID | NUMBER OF PAGES | NUMBER OF COPIES | PAPER CASSETTE | OWNER | PRINTING SURFACE | SORTING | STAPLING |
|---|---|---|---|---|---|---|---|---|
| 1ST JOB | 07 | 10 | 3 | AUTO | owner5 | DOUBLE | ON | ON |
| 2ND JOB | 08 | 5 | 1 | AUTO | owner1 | SINGLE | OFF | OFF |
| 3RD JOB | 09 | 1 | 1 | FIRST | owner3 | SINGLE | OFF | OFF |
| 4TH JOB | 10 | 3 | 2 | MANUAL | owner1 | DOUBLE | ON | ON |
| ... | ... | ... | ... | ... | ... | ... | ... | ... |

IMAGE PROCESSING SYSTEM AND IMAGE FORMING APPARATUS

This application is based on Patent Application No. 9-70873 filed in Japan, the contents of which is hereby incorporated by reference.

FILED OF THE INVENTION

The present invention relates to a printer connected to a network, a printer server provided between the network and the printer for connecting the printer to the network, and an image processing system comprising the printer, the printer server and the network.

BACKGROUND OF THE INVENTION

In recent years, a Local Area Network (LAN) is constructed by connecting a plurality of computers via a communication line so that the resources can commonly be shared by users. In many cases, a small number of printers are also connected to the network, so that a number of users commonly use the printers. Upon utilizing these printers on the network, the users can print images such as documents, drawings and photographs, formed on their own computers or obtained from other devices, by utilizing printer drivers. In each printer, execution/non-execution of functions characteristic of the printer, e.g., sorting, stapling and punching can be set, as well as setting of the size of a print sheet, the number of pages, and a paper tray to be used, and the like. All the functions, including these functions characteristic of the printer, can be set by utilizing a printer driver to be exclusively used for the printer.

SUMMARY OF THE INVENTION

However, when a print request for the printer is prepared by using a PDL printer driver which is not exclusively used for the printer, it is possible to set the basic setting items such as the size of a print sheet, the number of pages and a paper tray to be used, however, depending on the printer driver, it is sometimes impossible to set execution/non-execution of the functions characteristic of the printer, such as sorting, stapling and punching.

Further, in a case where a print request, where the size of a print sheet, the number of pages and a paper tray to be used are set, has been issued, if the contents of the setting in the print request must be changed or additional setting must be made, the print request is canceled, then necessary items are set again, and the request is re-issued. In such case, if a printer, which receives a number of print requests and performs printing in the received order, is used, the printer, that has last received the above re-issued print request, does not perform printing based on the canceled print request but performs printing based on the re-issued print request which has been received last.

Further, in use of a printer which cannot receive a number of print requests, print requests are stored in received order in a printer server which exists between the network and the printer. In this case, when the print mode of an already-issued print request must be changed, the print request is canceled, then setting is made again, and the print request is re-issued. If the printer receives the re-issued print request last, it performs printing based on the re-issued print request last.

In any type of printer, only for partial change and/or addition with respect to the print mode of an already-issued print request, all the print information must be sent again. This increases the load on the network, thus degrading the efficiency of the entire system.

The present invention realizes a network system in which, before a printer starts printing in accordance with a print request from a printer driver, the set items for the print job, such as the size of a print sheet, the number of pages and a paper tray to be used, can be changed, and further, additional mode setting such as execution/non-execution of sorting, execution/non-execution of stapling and execution/non-execution of punching can be made, from an operation panel of the printer or a printer server, without changing the position of the print job in the printing order.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an example of an image for settings of print sheet and the like, displayed by a printer driver of the embodiment of the present invention;

FIG. 14 is a sample of a job-list display image, displayed on the display of the operation panel OP;

FIG. 16 is an example of a paper-tray information management table in the digital copying machine;

FIG. 17 is an example of a job management table in the digital copying machine;

DETAILED DESCRIPTION OF THE INVENTION

Preferred embodiments of the present invention will now be described in detail in accordance with the accompanying drawings.

Generally, a digital copying machine functions as both a copying machine and as a printer. In the embodiments, "digital copying machine" or simply "copying machine" without any particular annotation means a function as a printer of a digital copying machine, which is not substantially different from a general printer.

The word "Paper" in the specification means not only paper made of natural material but also includes a plastic film e.g. sheet for overhead projector, possible to print characters, drawings and photographs thereon.

The word "Image" on the specification includes character, drawing and photograph.

In the present invention, a PDL mode which can be set by PDL (paper description language) printer driver is a mode setting an image printing area on paper, selecting the paper size, selecting paper direction, selecting image magnification, etc., and a original printing mode is a mode handling paper after printing operation is finished, such as sorting, double sided printing, stapling and punching.

Furthermore, a changing mode includes changing the content of a mode to different one, such as re-setting of paper size from size B5 to size A4, and adding a new process, such as stapling, that is not set previously.

Figure 1:
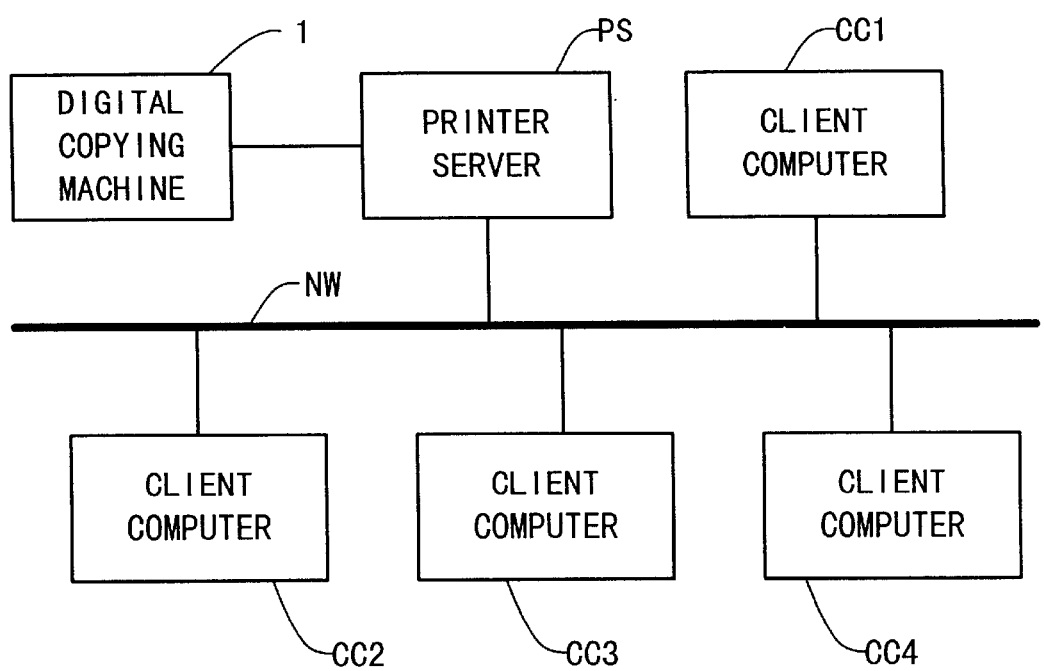
FIG. 1 is a block diagram showing the schematic construction of a network, and a digital copying machine, a printer server and client computers, connected to the network, according to an embodiment of the present invention.

FIG. 1 is a block diagram showing the construction of a system according to a first embodiment of the present invention. The system comprises a network NW, a digital copying machine 1, a printer server PS, and a plurality of client computers CC1 to CC4. The printer server PS and the client computers CC1 to CC4 are interconnected via the network NW. Data communication of image data, various commands and the like can be performed between the client computers CC1 to CC4 and the printer server PS, or among the client computers CC1 to CC4.

Further, the digital copying machine 1 is connected to the printer server PS. The digital copying machine 1 has a function to print-output image information received from the client computers CC1 to CC4 via the printer server PS, as well as an ordinary function to duplicate or copy original images.

Generally, the printer server PS receives image information described in page description language (PDL) from the client computers CC1 to CC4, converts it to bit mapped image data, and outputs the bit mapped image data to the digital copying machine 1.

Figure 2:
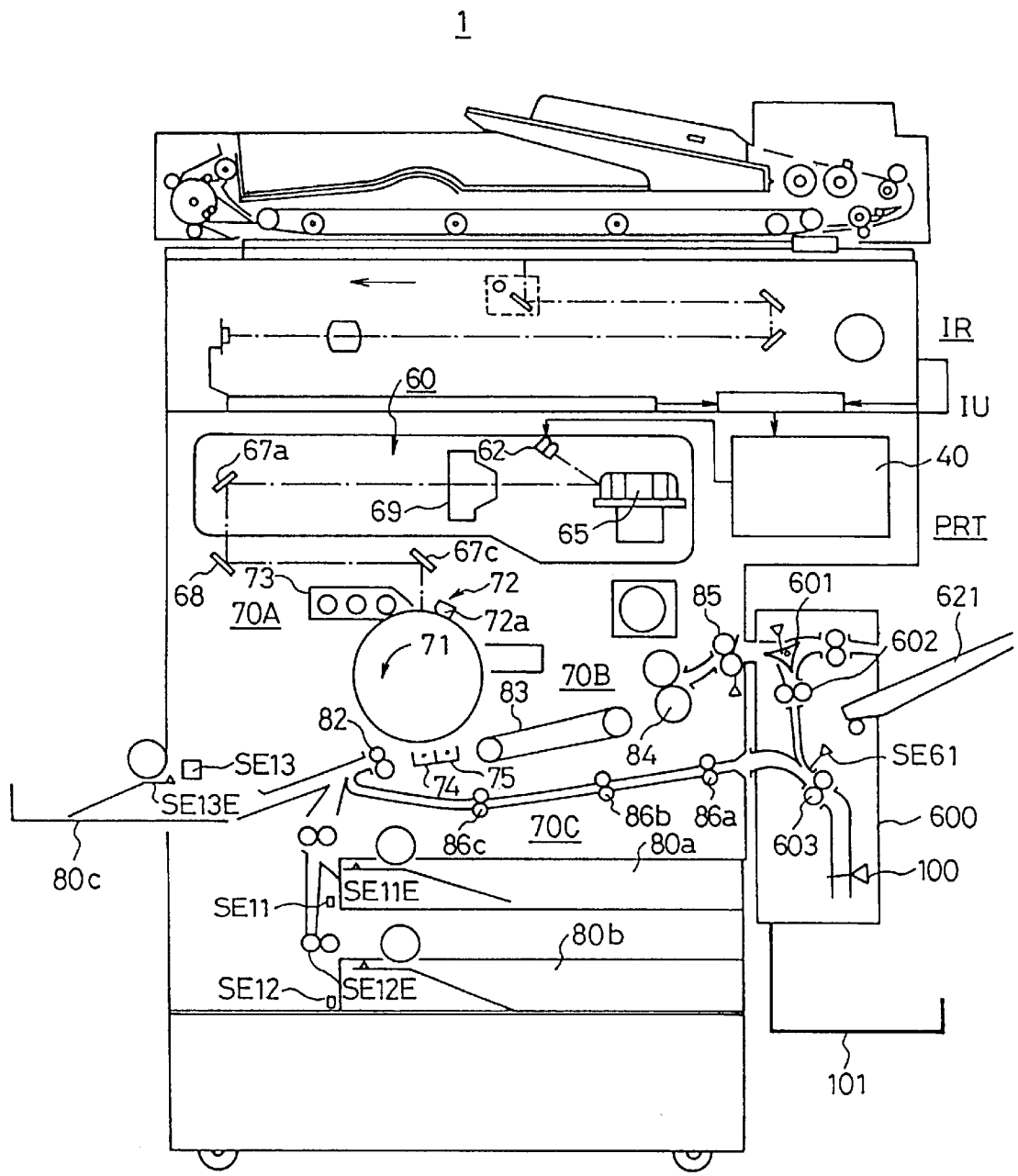
FIG. 2 is a cross-sectional view showing the structure of the digital copying machine according to the embodiment of the present invention.

FIG. 2 is a cross-sectional view showing the overall structure of the digital copying machine of the present invention.

The copying machine 1 is a digital copying machine comprising an image reader IR, a page printer PRT, an interface unit IU and the like.

The page printer PRT comprises a printing processing unit 40 which outputs an exposure control signal, a printing head 60 using a semiconductor laser 62 as a light source, an exposure unit 70A having a photosensitive drum 71 and peripheral devices, a fixing unit 70B having a pair of fixing rollers 84, a pair of paper discharging rollers 85 and the like, and a return conveying unit 70C including a unit 600. The page printer PRT prints a copied image by a electrophotographic process, based on image data transferred from the image reader IR or image data received from the external devices via the interface unit IU.

The page printer PRT has, at its lower part, two paper cassettes 80a and 80b, which respectively contain several hundreds of print sheets, paper-size detection sensors SE11 and SE12, a manual paper-feed port 80c on which OHP sheets, post cards, and unfixed-sized sheets are set, a manual-feed paper-size detection sensor SE13, and a group of paper feed rollers.

Further, the page printer PRT has empty sensors SE11E, SE12E and SE13E which detect existence/absence of paper at the two paper cassettes 80a and 80b and the manual paper-feed port 80c.

A laser beam emitted from the semiconductor laser 62 is deflected by a polygon mirror 65 in a main-scanning direction, and introduced to an exposure position on the photosensitive drum 71 via a main lens 69 and various mirrors 67a, 68 and 67c. The surface of the photosensitive drum 71 is uniformly charged by a charger 72. With the rotation of the photosensitive drum 71, a latent image formed by exposure becomes a toner image via a developer 73, and the toner image is transferred onto a print sheet by a transferring charger 74 at a transfer position (copying position). The print sheet is separated from the photosensitive drum 71 by a separating charger 75, sent to the pair of fixing rollers 84 by a transfer belt 83, and discharged in a face-up manner.

The unit 600 is set at a side of the page printer PRT, as an additional device for automating double-sided copying and discharging a print sheet with its printing surface faced down. The unit 600 has a function to temporarily contain a print sheet discharged from the page printer PRT by the discharging roller 85, and perform switch-back transfer to return the sheet to the page printer PRT.

In a single-sided copying mode, the print sheet is discharged, through the unit 600, onto a paper discharge tray 621. On the other hand, in a double-sided copying mode, the left end portion on a switching guide 601 is moved upward by a solenoid (not shown), and the print sheet discharged by the discharging roller 85 passes through the transfer roller 602 and reaches a reverse roller 603. When the rear end of the print sheet reaches a paper sensor SE61, the reverse roller 603 reverse-rotates.

Thus, the print sheet is returned to the page printer PRT. The print sheet is sent to a timing roller 82 via horizontal transfer rollers 86a to 86c, and becomes into a waiting state for printing on its rear surface (unprinted surface). If a plurality of print sheets have been continuously fed, the print sheets are sequentially conveyed at a predetermined intervals, not to overlap with each other, to the unit 600. As the length of a paper conveying path is fixed, a number N of print sheets at one circulation (the maximum number of circulated print sheets) by the unit 600 and the horizontal transfer rollers 86a to 86c depends on the size of print sheet.

In a printer mode, the left end portion on the switching guide 601 is moved upward by the solenoid (not shown), and the right end portion on the switching guide 601 is moved downward. The print sheet discharged by the discharging roller 85 passes through the conveying roller 602 and reaches the reverse roller 603. When the rear end of the print sheet reaches the paper sensor SE61, the reverse roller 603 reverse-rotates. This discharges the print sheet with its printing surface faced down, onto the paper-discharge tray 621.

Further, in case of stapling, the printed sheets have been passed through the reverse roller 603 and stacked, then the print sheets are stapled by a stapler 100 and discharged into a paper-discharge basket 101. In case of sorting, the print sheets are sorted by sliding the paper-discharge tray 621 at each copy.

Figure 3:
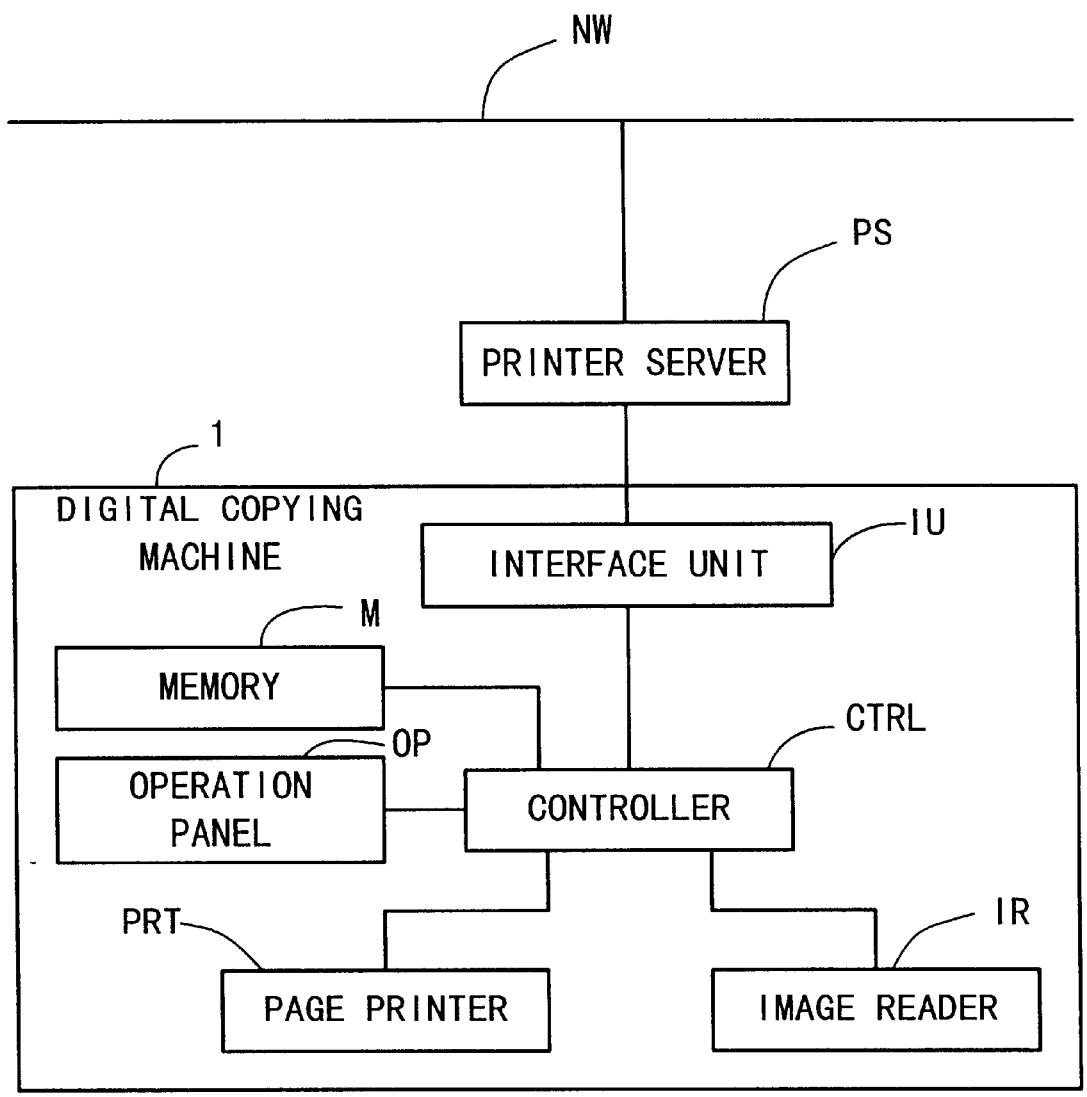
FIG. 3 is a block diagram showing the control construction of the digital copying machine according to the embodiment of the present invention.

FIG. 3 is a block diagram showing the control construction of the digital copying machine.

Regarding the function to copy an original image, a controller CTRL controls the digital copying machine 1 in accordance with an instruction from an operation panel OP. The original image is read by the image reader IR, and the page printer PRT performs printing based on image data from the image reader, on conditions (the number of pages, the density, and double-sided copy, single-sided copy, 2 in 1 or the like) designated from the operation panel OP.

The digital copying machine 1 is connected to the printer server PS via the interface unit IU. The digital copying machine 1 print-outputs image data received from the client computers CC1 to CC4 via the printer server PS.

A memory M is used for storing a job management table for managing print modes, image data and jobs, and a paper-feed port management table for managing information on the paper cassettes 80a and 80b and the manual paper-feed port 80c.

Figure 4:
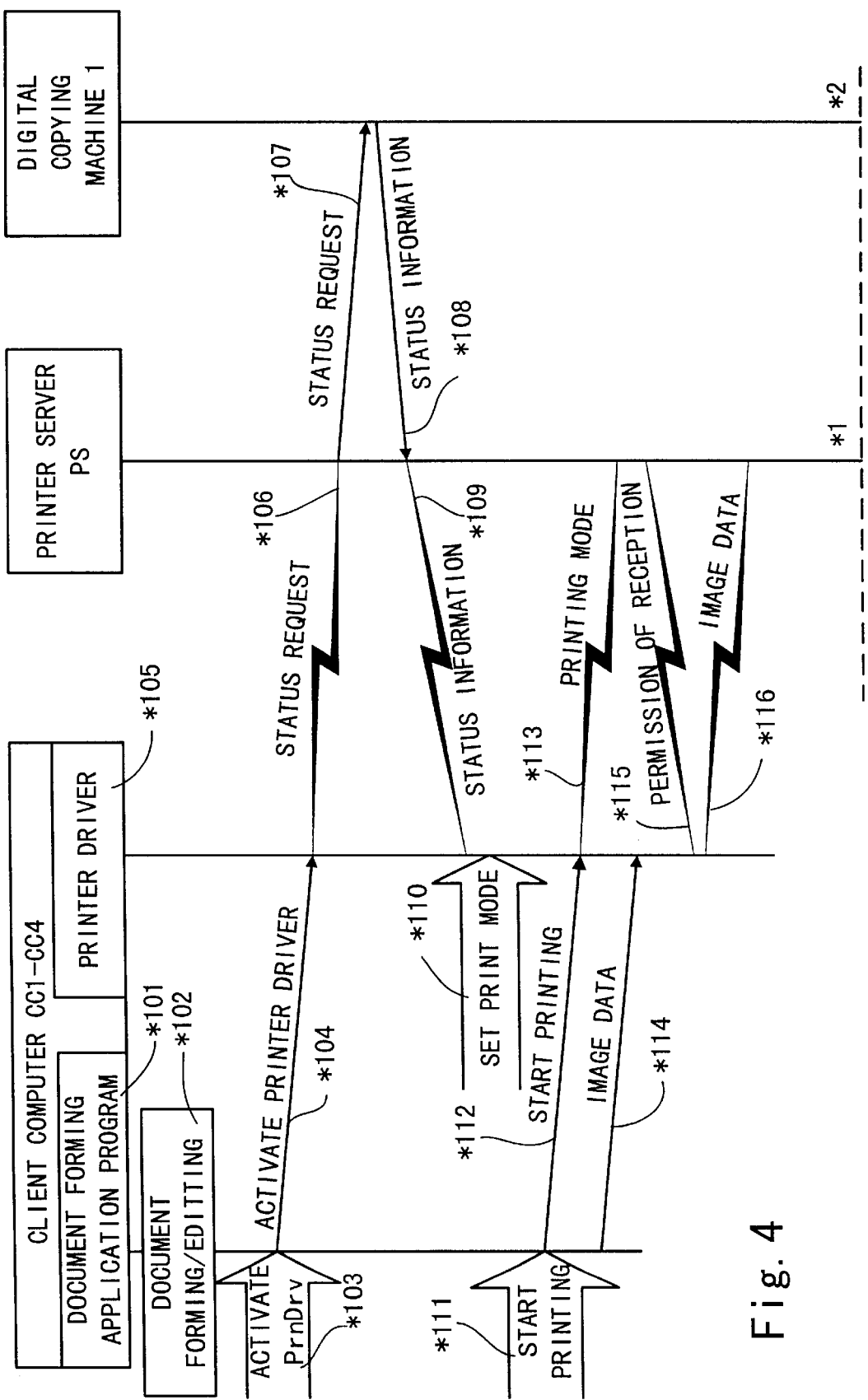
FIG. 4 is a sequence diagram showing the first half of a print sequence of the network system according to the embodiment of the present invention.
Figure 5:
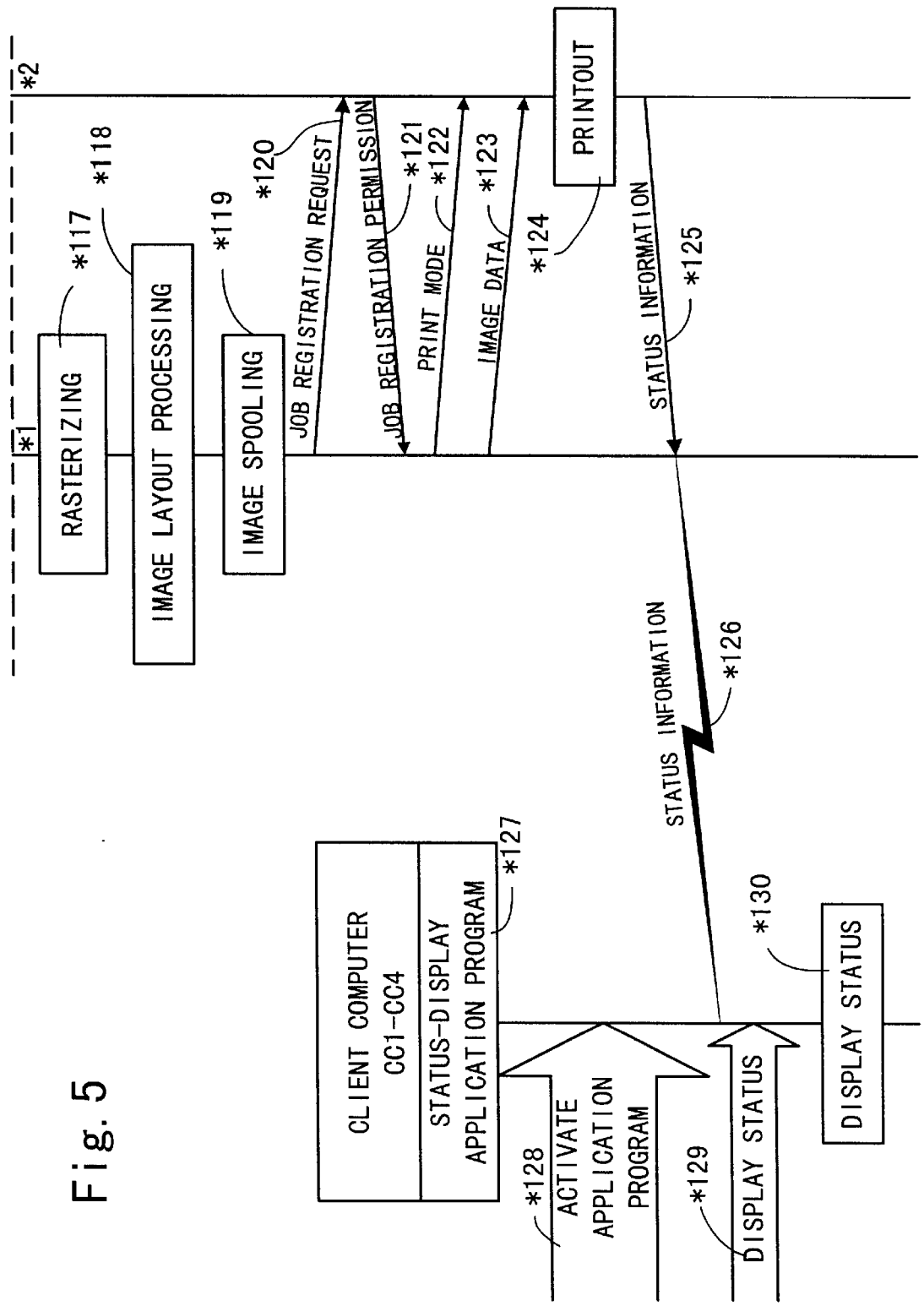
FIG. 5 is a sequence diagram showing the last half of the print sequence of the network system according to the embodiment of the present invention.
Figure 7:
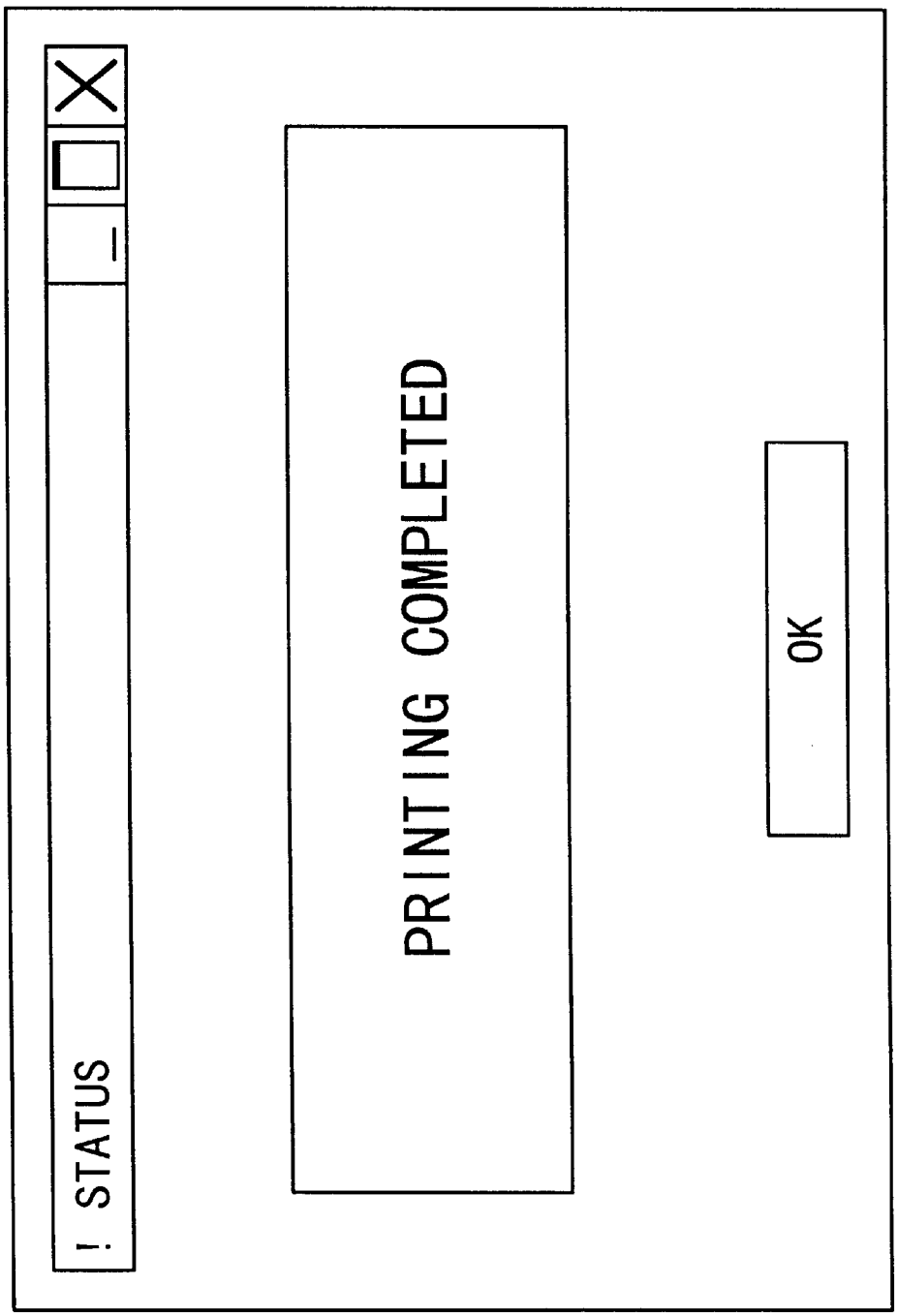
FIG. 7 is an example of a message image indicating the completion of a print job, displayed by a status-display application program.

FIGS. 4 and 5 are sequence diagrams showing a print sequence of the network system. Note that these two figures respectively show the first half and the last half of the originally single print sequence, and lines *1 and *2 extending from the printer server PS and the digital copying machine 1 in FIG. 4 are respectively connected to lines *1 and *2 in FIG. 5.

Figure 8:
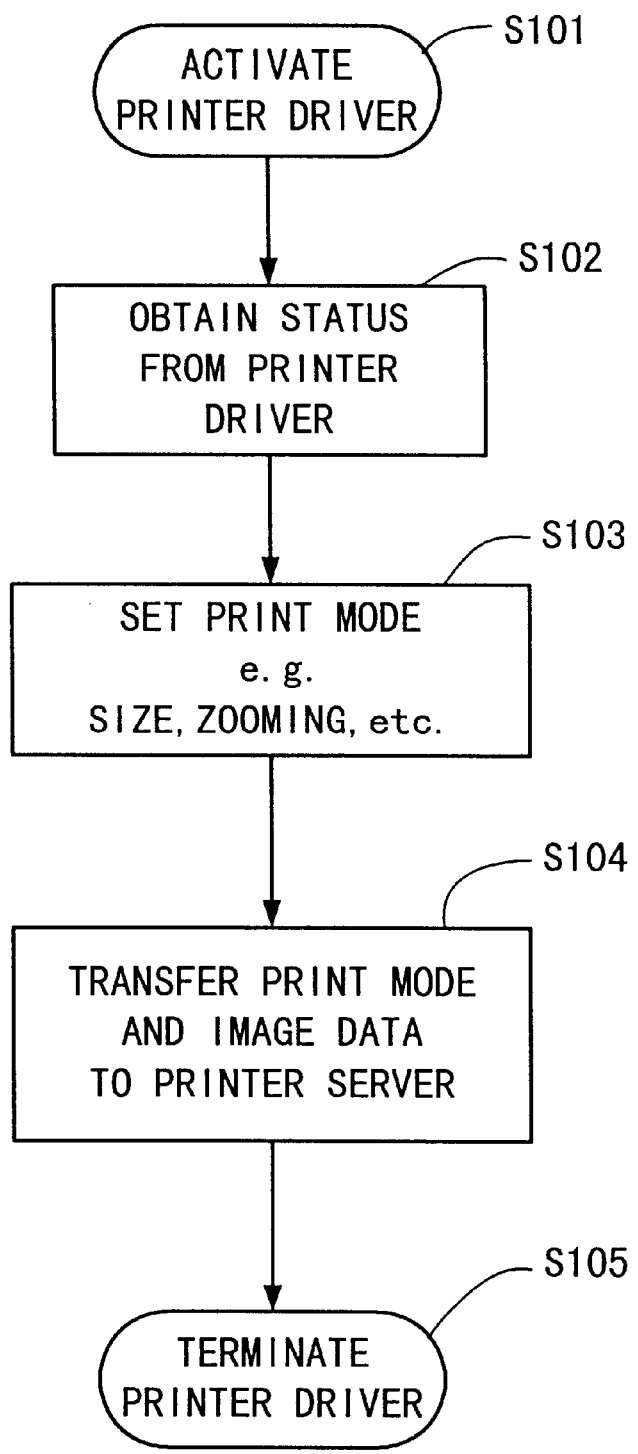
FIG. 8 is a flowchart showing the operation of the printer driver.

FIG. 8 is a flowchart showing the operation of a printer driver activated by a document-forming application program *101 (FIG. 4) on the client computers CC1 to CC4.

First, the printer driver is activated (step S101), then status information is obtained from the printer server PS (step S102), and a printer driver image (FIG. 6) is displayed on a display. On this image, a print mode which can be set with the printer driver is set (step S103), and the set print mode and the image data are transferred to the printer server PS (step S105). Then, the printer driver is terminated.

Here, description will be made on the sequence at a point where the user instructs to perform printing on the client computers CC1 to CC4 to a point where the print data is registered into the digital copying machine 1, and the sequence at a point where the print data is print-outputted from the digital copying machine 1 to a point where a status of the completion of printing or the like is displayed on "status display application program" running on the client computers CC1 to CC4, with reference to FIGS. 4 to 8.

Note that in the first embodiment, the digital copying machine 1 receives a number of print requests (print jobs and copying jobs), stores the received job data, and sequentially print-outputs the data in the received order. The digital copying machine 1 of this type has a job management table in its memory. The management table contains print mode information, storage addresses of image data and the like.

(a) Document Formation

The user uses the document-forming application program *101 which operates on the client computers CC1 to CC4 to perform forming/editing *102 on an object document.

Generally, the document-forming application program *101 is stored in a hard disk. It is loaded onto the memory by the user when necessary, and executed under the control of a CPU.

At this time, the layout of the document, print instruction information and the like are displayed on the display.

Further, character input, image editing, print instruction and the like are made by the user with a keyboard and/or mouse. These information are notified to the CPU and processed.

(b) Activation of Printer Driver

To translate the document formed by the document-forming application program *101 into specific page description language or to set various operation modes such as the size of a print sheet, the number of copies, and a paper-feed port, the user loads a printer driver *105 exclusively used for the digital copying machine 1 as described above, from the hard disk to the memory and activates the printer driver, on the client computers CC1 to CC4 (*103 and *104; step S101 in FIG. 8).

(c) Acquisition of Status Information

The activated printer driver *105 issues a status request to the printer server PS (*106) to obtain the mechanical status of the digital copying machine 1 and the status of registered job(s).

As the printer server PS that has received the request does not have the required status information on the digital copying machine 1 at this time, the printer server PS further transfers the status request to the digital copying machine 1 (*107).

In response to the request, the digital copying machine 1 sends its status information to the printer server PS (*108).

The printer server PS further transfers the received status information to the client computers CC1 to CC4 (*109).

By this communication operation, the printer driver *105 on the client computers CC1 to CC4 has completed the acquisition of the status of the digital copying machine 1 (step S102).

Note that at this time, the printer server PS performs communication with the digital copying machine 1, to obtain the status of the digital copying machine 1, further, the printer server PS adds job status and the like spooled in the memory of the printer server PS or the hard disk to the status information, and notifies the client computers CC1 to CC4 of the information.

(d) Print Mode Setting

On the printer driver image (FIG. 6), the size of a print sheet, a paper-feed port, and the number of copies are set (*110; step S103 in FIG. 8).

Figure 6:
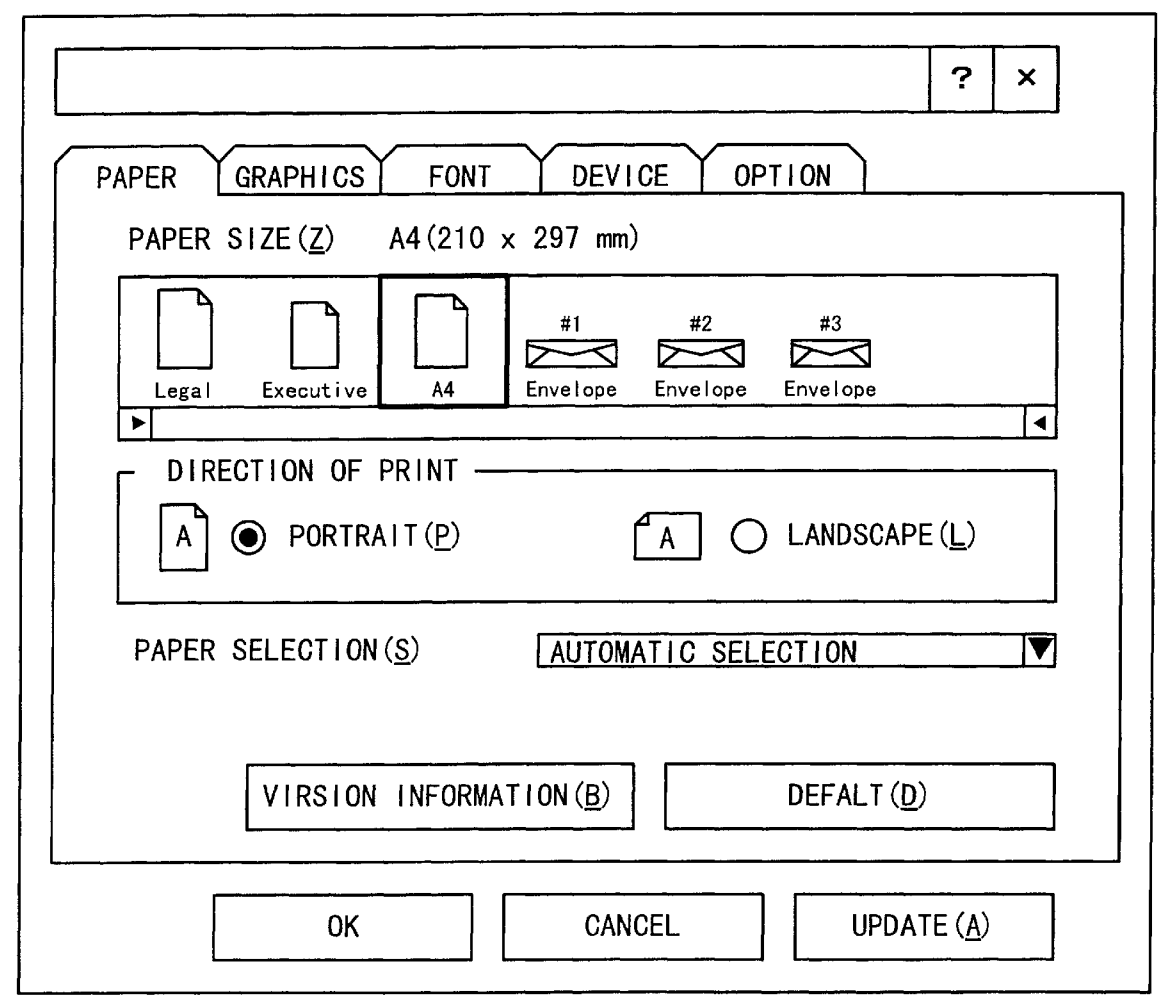

FIG. 6 is a sample of a display image for settings of print sheet and the like, displayed by the printer driver (*105) activated by the document-forming application program *101 on the client computers CC1 to CC4.

In this image, "A4" is selected as the print sheet size; "PORTRAIT", as the printing direction; and "AUTOMATIC SELECTION", as the paper-feed method.

Note that if it is found from the status information obtained in the above stage (c), that a function item cannot be set with the printer driver and the printer does not have the function, the setting is prohibited (selection becomes impossible otherwise the corresponding items are not displayed).

(e) Printing Start

When the user has completed the print mode setting (*110), he/she instructs to start printing (*111) in the document-forming application program (*101). In response to the instruction, the document-forming application program (*101) instructs the printer driver (*105) to start printing (*112), thus, the printer driver (*105) informs the printer server PS of the print mode (the size of a paper sheet, the number of copies, and a paper-feed port) set in the above stage (d) via the network (*113).

If the printer server PS determines the current print job as acceptable, it notifies the printer driver (*105) that the reception of the print job is permitted (*115), and the printer driver (*105) that has received the permission of the reception transfers image data to the printer server PS. The printer server PS starts reception of the image data (*116; step S104 in FIG. 8).

When the image data transfer has been completed, the printer driver (*105) terminates its operation (step S105).

(f) Rasterizing and Image Layout

Generally, image data outputted from the printer driver (*105) is not bitmapped image data but data in page description language. To print an image by the digital copying machine 1, it is necessary to convert (rasterize; *117) the page description language data into bitmapped data and transfer the converted data to the digital copying machine 1.

Further, if the print mode requiring layout processing is set in the print mode notified from the printer driver (*105), rasterizing is performed in consideration of layout (*118).

In the present embodiment, data from the client computer (CC1–CC4) (the print mode information (the size of a paper sheet, the number of copies, and a paper-feed port) and image data) is received by the printer server PS via the network NW, analyzed by the printer server PS, and mapped on the memory of the printer server PS.

(g) Image Spooling

The image data rasterized in the above stage (f) is temporarily stored (spooled) in the hard disk of the printer server PS (*119).

Thus, print jobs from the client computers CC1 to CC4 can be received regardless of the status of the digital copying machine 1, e.g., when it is printing in accordance with a print job from another user.

(h) Activation of Status-Display Application Program

When the printer driver on the client computers CC1 to CC4 has transferred all the print data from the document-forming application program to the printer server PS, a status-display application program (*127) is loaded from the hard disk in the client computers CC1 to CC4 to the memory of the client computers and activated (*128).

(i) Transfer of Print Job to Digital Copying Machine

The printer server PS issues a job registration request to the digital copying machine 1 at appropriate timing (*120), and when it receives a job-registration permission from the digital copying machine 1 (*121), the printer server PS transfers the spooled print job (print mode information (the size of a paper sheet, the number of copies, and a paper-feed port) and image data) to the digital copying machine 1 (*122 and *123).

The digital copying machine 1 performs printing in accordance with the received print mode (*124).

(j) Notification of Completion of Printing

When the digital copying machine 1 has completed printing of the print job transferred from the printer server PS, it notifies the printer server PS of the completion of the printing by using its status information (*125).

The printer server PS updates its job management table, and notifies the client computers CC1 to CC4 of the completion of the job (*126).

(k) Status Display

The client computers CC1 to CC4 is notified by the status information that the print job they instructed has been completed, then display that status on the display (FIG. 7) by the status-display application program (*127) loaded on the memory (*130).

The flow of information among the client computers CC1 to CC4, the printer server PS and the digital copying machine 1 according to the present embodiment is as described above.

On the other hand, when printing is started based on a job received via the interface unit IU, the digital copying machine 1 of the present embodiment waits to start printing for a print-start standby period of a set value, which is one of the print mode information of the current job. When the set period elapses, or when a start key is depressed, the digital copying machine starts printing. It is possible to change the print mode on the operation panel OP during this print-start standby period or to add a print mode (execution/non-execution of sorting, execution/non-execution of stapling and execution/non-execution of puching and such like) of the digital copy machine that cannot be set with the printer driver.

Figure 9:
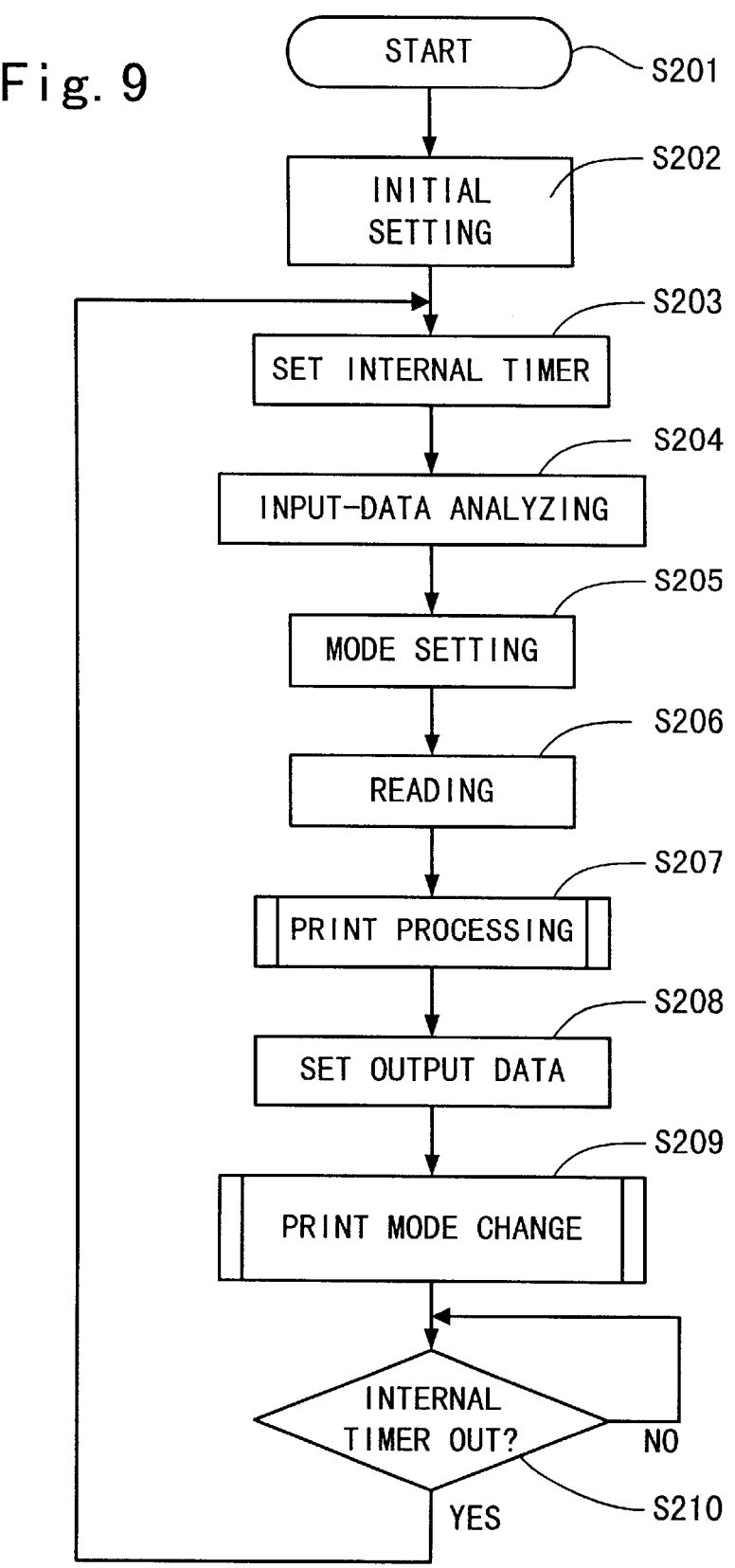
FIG. 9 is a flowchart showing the control of the digital copying machine according to the embodiment of the present invention.

FIG. 9 is a flowchart showing the operation of the controller CTRL of the digital copying machine 1.

When the power is turned on or a reset button is depressed, the process starts (step S201), and after initial setting such as mode setting of peripheral device (IC) and the like (step S202), an internal timer is set (step S203). Note that this timer is used for controlling the period to execute the routine.

As shown in FIG. 3, the controller CTRL of the digital copying machine 1 inputs various data from the interface unit IU, the memory M, the operation panel OP, the page printer PRT and the image reader IR.

The data, including print job information sent from an external device via the inter face unit IU, input information from the operation panel OP, status information from the page printer PRT, are analyzed by input-data analyzing processing (step S204).

Then, at mode setting processing (step S205), the operation mode is set in accordance with the result of above analyzing processing. For example, a print mode (the size of a paper sheet, the number of copies, and a paper-feed port), such as print mode information *122 in FIG. 5, is written into the job management table.

At reading processing (step S206), image data, obtained by, e.g., reading sent image data, such as image data *123 in FIG. 5, is written into an image memory.

At print processing (step S207), which is a print processing subroutine to be described later in FIG. 10, image data of the highest-ordered job in the job management table is print-outputted in accordance with its print mode data (the size of a paper sheet, the number of copies, and a paper-feed port).

Further, as described later, as the standby period is set, printing is suspended for the set period, but suspended printing operation is released by depressing of the start key. During this standby period, the user can change or add the print mode in the job management table.

At output data setting (step S208), output data such as commands designating the operations of the page printer PRT, image reader IR and the like, in the digital copying machine 1, is set at a communication port.

At print-mode changing (step S209) which calls a print-mode change subroutine to be described later in FIG. 12A and FIG. 12B, the print mode of a print job already stored in the digital copying machine 1 can be changed or added.

At step S210, a time-out status of the timer set at the internal-timer setting (step S203) is monitored. When the time-out status is detected, the process returns to the internal-time setting (step S203).

Thereafter, the digital copying machine 1 repeats the operations at steps S203 to S210.

Figure 10:
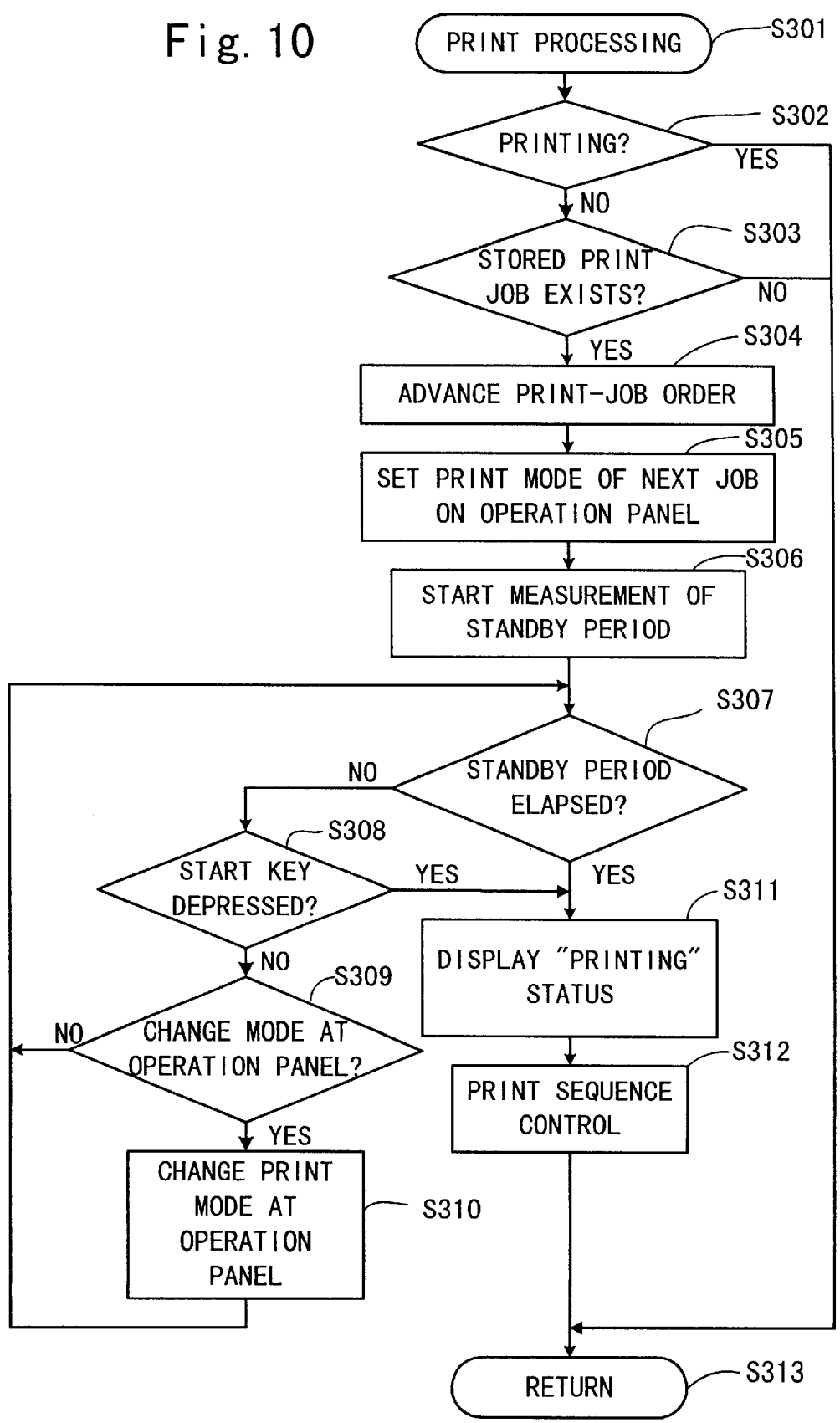
FIG. 10 is a detailed flowchart of subroutine "print processing" (step S207) in the flowchart of FIG. 9.

FIG. 10 is a flowchart showing the details of the print processing subroutine (step S207) in FIG. 9.

When the present subroutine is called, the print-processing subroutine (step S207) starts (at step S301). Then, it is checked whether or not the digital copying machine 1 is currently performing printing (step S302), and if YES, the process proceeds to step S313.

If the digital copying machine 1 is not currently performing printing, the job management table is referred to check whether or not a print job (including a copying job) is stored (step S303). If NO, the process proceeds to step S313.

If YES, the order of the job management table is advanced by one (step S304). Thus, the advanced job is displayed on the display panel (step S305), then a standby timer is set to the predetermined standby period, and time measurement is started (step S306).

At step S307, it is checked whether or not the standby period has elapsed, and if YES, the next "printing" status is displayed on the operation panel OP (step S311).

If the standby period has not elapsed, it is checked whether or not the start key is depressed, (step S308). If the depression of the start key is confirmed, the process proceeds to step S311 at which "printing" status is displayed on the operation panel OP.

If the start key is not depressed, it is checked whether or not mode change is to be made at the operation panel OP (step S309). If NO, it is again checked whether or not the standby period has elapsed (step S307).

If the mode change is to be made (step S309), the mode data of the current job (in this case, the print job to be performed) is replaced with the data changed at the operation panel OP (step S310). Then the process returns to the main routine, and by the depression of the start key (step S308) or the elapse of the standby period (step S307), the process proceeds to step S311.

The "printing" status is displayed on the operation panel OP, and immediately print sequence control is started (step S312) to perform printing. After the printing, the process returns from this routine to the main routine (FIG. 9).

Steps S306 to S310 in FIG. 10 mean that before the digital copying machine 1 starts printing, it waits for a predetermined standby period, and during this period, the user can change or add the mode of the current job by the operation panel OP.

Note that in the digital copying machine 1, the standby period is set in an image which generally is not used by the user. Although not shown in the flowchart, when a current job is displayed on the operation panel OP, if the start key is depressed with a "0" button of ten-keys 801 (FIG. 13) depressed, a standby period setting image is displayed. In this image, when a value is inputted by using the ten-keys and the start key is depressed, the standby period is settled, and the display image of the current job is restored.

Figure 11:
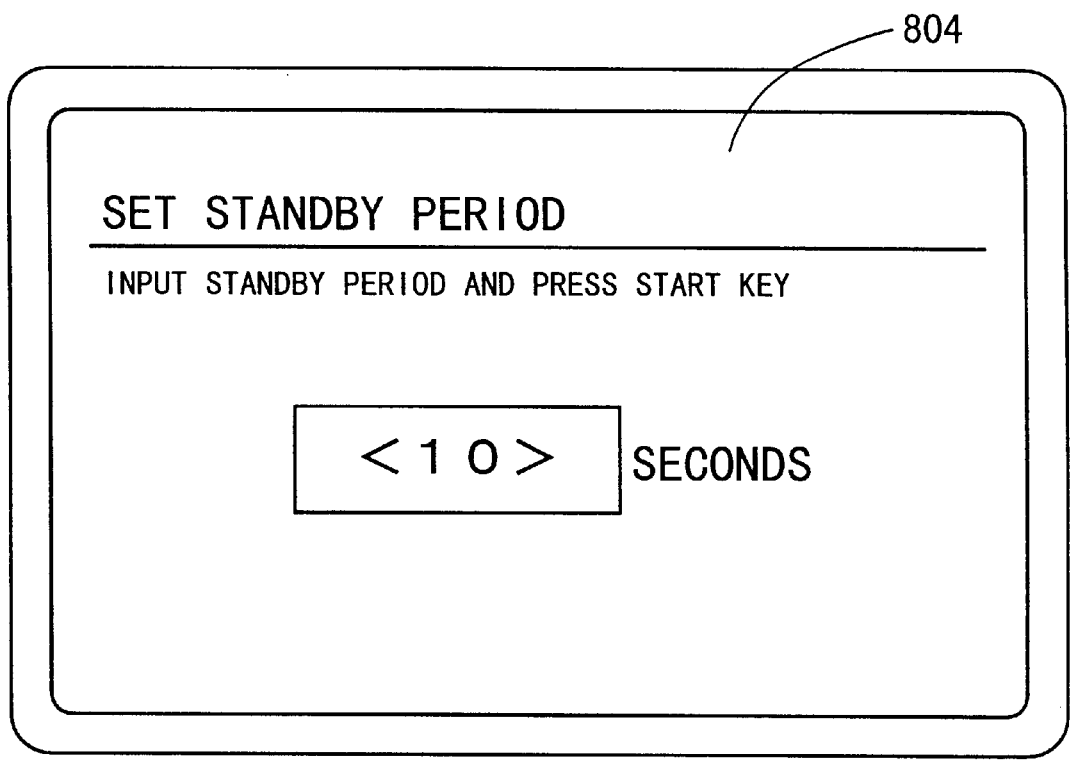
FIG. 11 is a sample of a standby period setting image, displayed on a display of an operation panel OP.

FIG. 11 is a sample of the standby period setting image, displayed on a display 804 of the operation panel OP. In this image, the standby period is set to ten seconds.

Figure 12A:
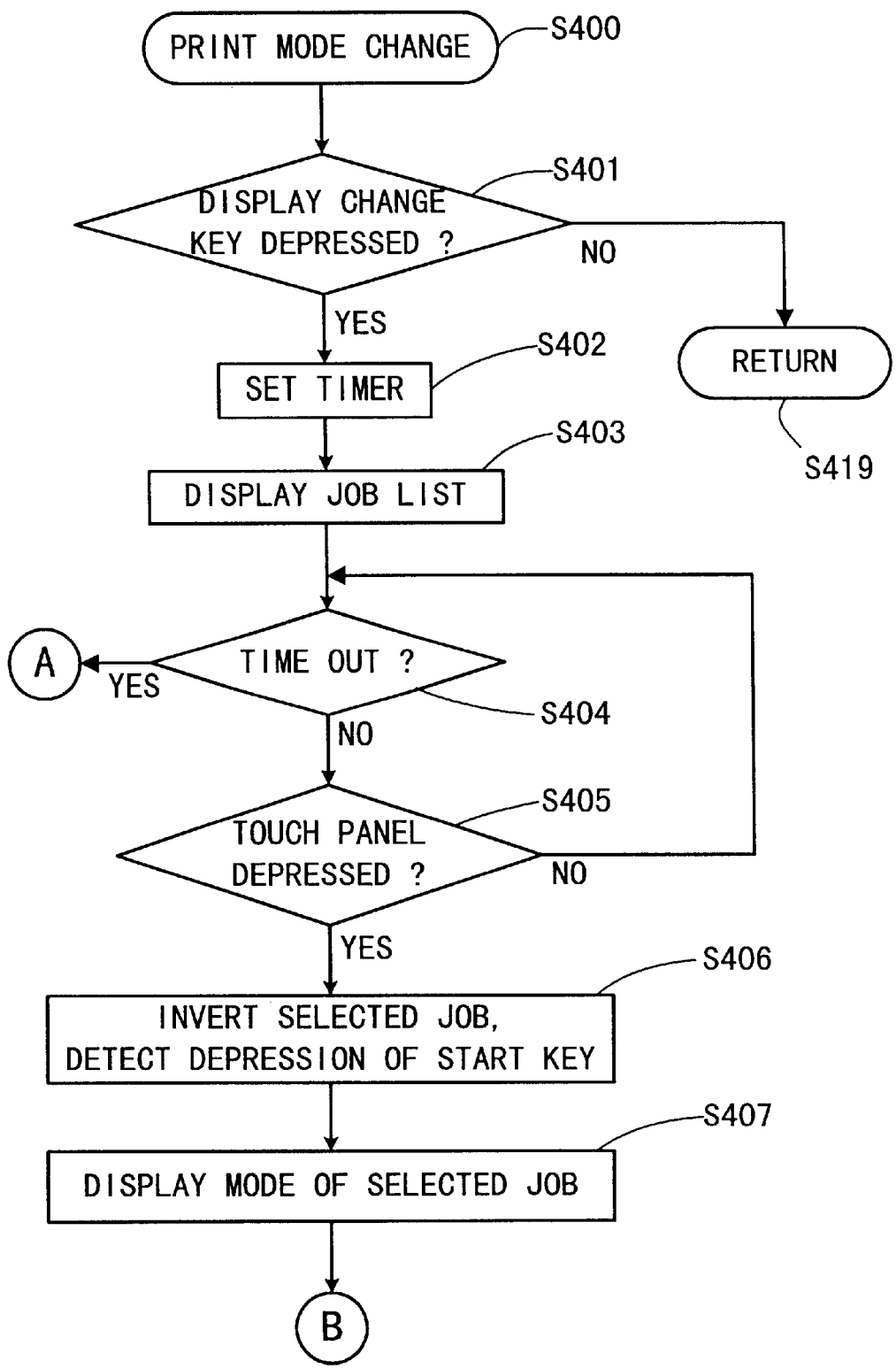
FIGS. 12A and 12B are detailed flowcharts of the subroutine "print-mode change" (step S209) in the flowchart of FIG. 9.
Figure 12B:
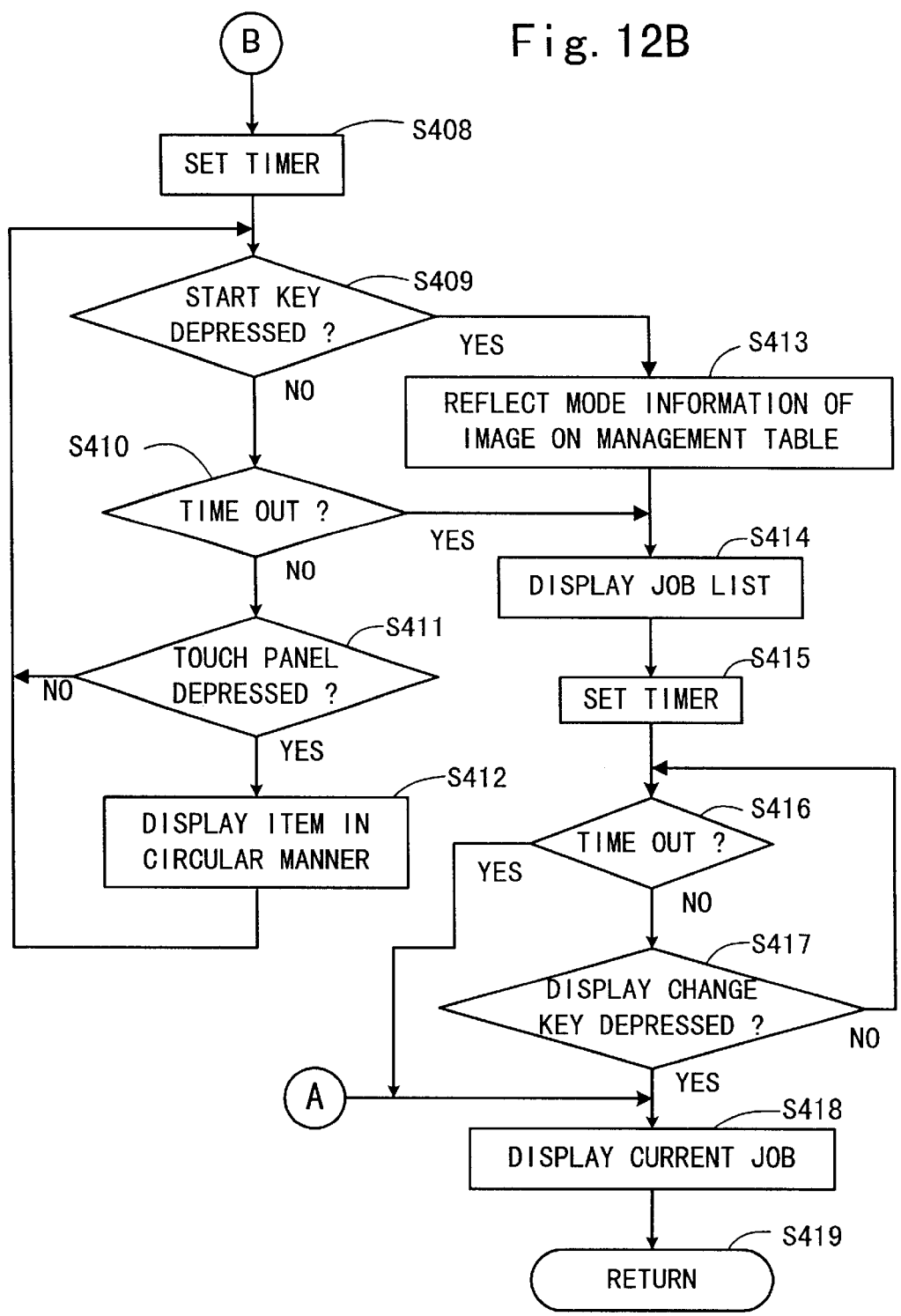

FIGS. 12A and 12B are flowcharts showing the print mode changing for a job in a printing queue, as a subroutine of the print mode change (step S209) in FIG. 9.

When the print-mode change subroutine (step S209) is called (step S400), it is checked whether or not a display change key 803 is depressed (step S401). If the depression of the display change key 803 is confirmed, a timer is set (step S402), and a job list is displayed on the display 804 of the operation panel OP (step S403).

If the user does not made any operation while the job list is displayed, the above timer becomes in time-out status (step S404), and the display is changed to the current job display (step S418). The process returns from this subroutine to the main routine (step S419).

Figure 13:
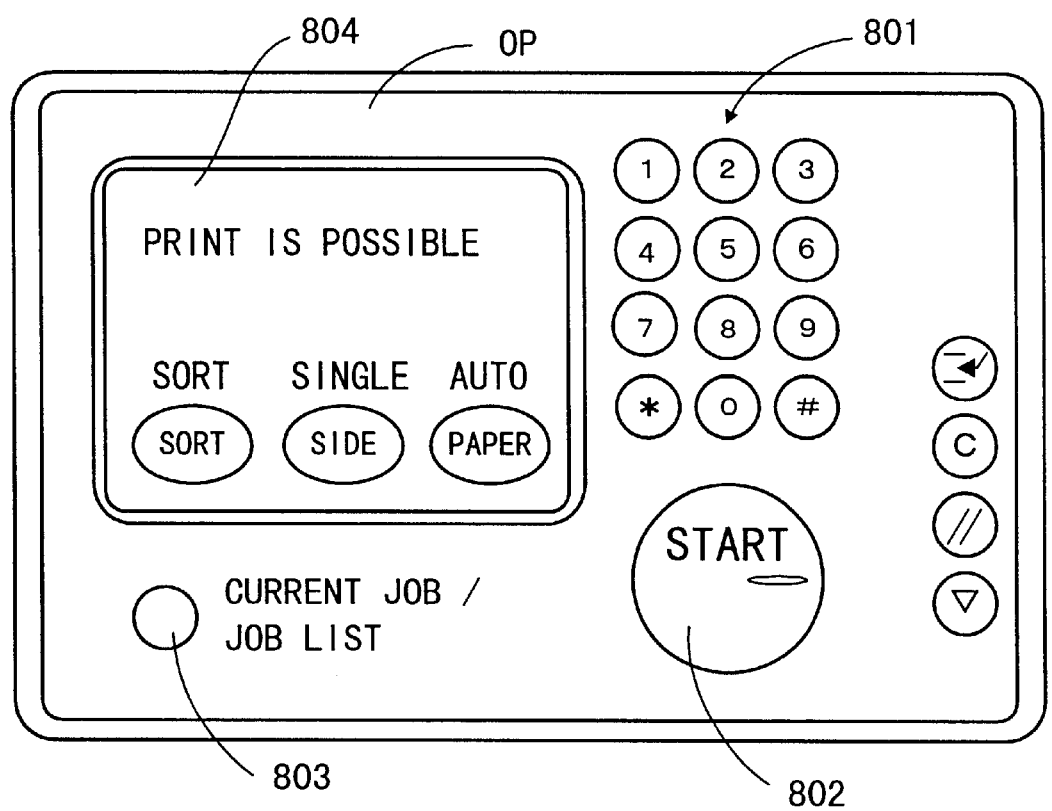
FIG. 13 is a plan view showing the operation panel OP with a display and operation keys.

FIG. 13 is a plan view of the operation panel OP with the display change key 803 which is a button to change to display the mode of a currently processed job (current job) or to display a stored job list on the display 804.

In this figure, the display 804, which displays a current job, displays only a message "print is possible" since there is no job.

FIG. 14 is a sample of the job-list display image, displayed by depression of the current job/job list display change key 803, on the display 804. The display 804 is a touch panel, and a job of which the mode is to be changed is selected by touching a portion where the job is displayed.

When the job is selected, the job is invert-displayed. Note that in FIG. 14, the selected job is represented in a lined block due to the regulations in drawings of patent application. The invert-display and the block are arranged for the user to confirm the selected job. Any emphasis in display such as blinking or color change may be made for this purpose.

Figure 15:
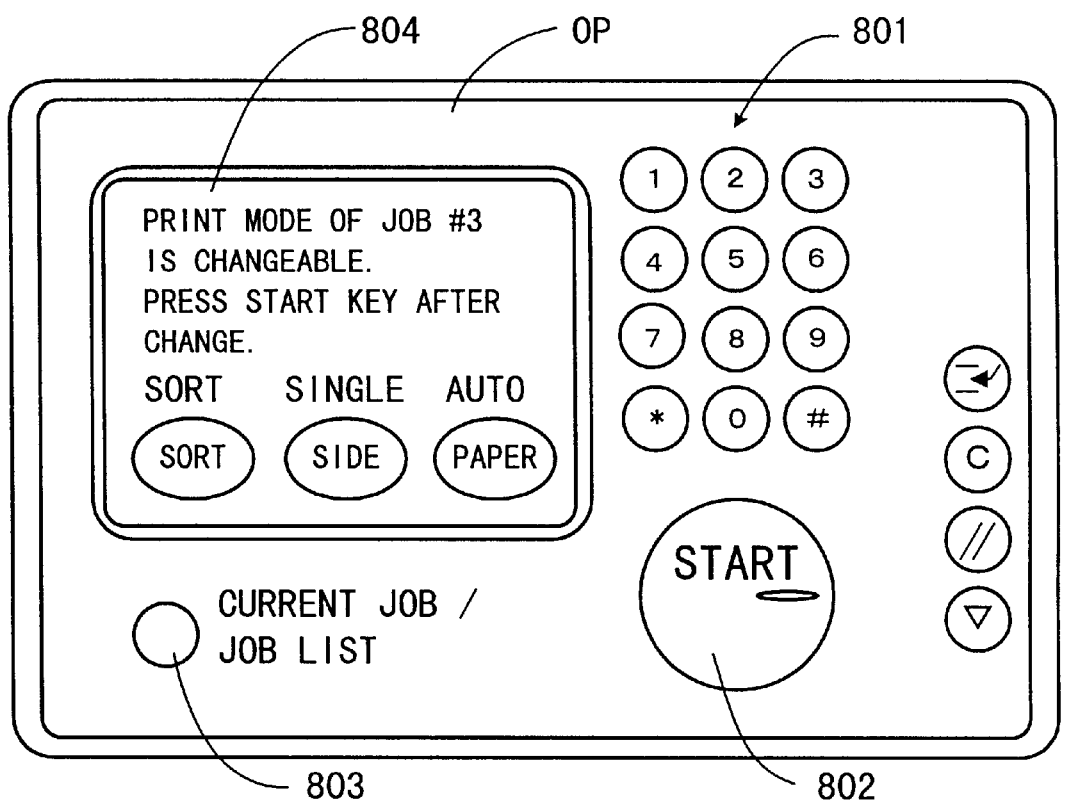
FIG. 15 is a sample of a print-mode change image for changing the print mode of a particular job, displayed on the display of the operation panel OP.

When a job is invert-displayed and the start key 802 is depressed, the print mode of the job is displayed on the display 804. FIG. 15 shows an example of the display image at this time.

In FIG. 12A, at step S405, the job is designated by depressing the touch panel, and at step S406, the designated job is invert-displayed (this display status indicates selected status) and the depression of the start key 802 is detected. At step S407, the selected job is displayed on the display 804.

Further, at step S408, a timer is set, and the process proceeds to selection of the next mode.

In FIG. 15, print mode change is to be performed on the third print job.

In this figure, terms "SORT", "SIDE" and "PAPER" in oblong circles indicate items of the print mode change. Terms "SORT", "SINGLE" and "AUTO" indicate the print mode status currently set in the printer.

On this screen, print modes such as sorting and printing surface cannot be set with the printer driver, and such print modes are additionally set on touch panel of the display 804 in the digital copy machine.

When the oblong-circled item portion is touched, the display above the oblong-circled item portion changes in a toggle or circular manner. The user repeats to touch the portion until a desired content is displayed.

The above operation is made as follows.

At step S409, it is checked whether or not the start key 802 is depressed, and if YES, the process jumps from the loop to step S413.

If the start key 802 is not depressed, it is checked at step S410 whether or not the timer set at step S408 is in time-out status.

If the timer is in time-out status, the process jumps from the loop to step S414.

If the timer is not in time-out status, the depression of the touch panel is detected, then one of the above print mode items is discriminated from the depressed position, and the content of the item is changed in a toggle or circular manner, by one step. For example, in FIG. 15, "SINGLE"-sided printing is selected as the current printing surface, however, if the oblong-circled portion with the term "SIDE" is depressed, the display above the depressed portion changes from "SINGLE" to "DOUBLE".

When this operation has been completed, or the depression of the touch panel has not been detected, the process returns to step S409, to repeat the above operations.

As described above, when the start key 802 has been depressed, the process proceeds to step S413. At step S413, the contents of the print mode items displayed on the display 804 are read, and the contents of the mode information in the job management table are rewritten, in accordance with the contents. In this manner, the job management table reflects the changed mode information. When this processing has been completed, the process proceeds to step S414.

On the other hand, when the process moves out from this loop due to time-out status, it can be considered that even if the items are changed on the display 804, the user have not determined the mode change as displayed contents. In this case, it is not appropriate to rewrite the job management table. Accordingly, the process proceeds from step S410 to step S414 without changing the job management table.

At step S414, similar to step S403, the contents of the job management table are displayed as a job list on the display 804.

After the display of the job list, a timer is set (step S415), and if depression of the display change key 803 is detected (step s417) or time-out status of the timer is detected (step S416), the current-job display image is restored (step S418). Then the process returns from the subroutine at step S419.

The memory M (FIG. 3) of the digital copying machine 1 contains various management tables.

FIG. 16 is an example of a paper information management table.

Information from the paper empty sensors SE11E to SE13E, at the respective paper cassettes 80a and 80b and the manual paper-feed port 80c, are reflected on the above table at any time.

Further, when a print sheet is inserted into the manual paper-feed port 80c, the user is required to input information on the size, direction and the type of the print sheet. As these information are inputted, the input data is reflected on the table.

FIG. 17 is an example of the job management table. The jobs are listed from the top as the initially-ordered job (actual arrangement of jobs on the memory is not limited to this order). In this case, the current job with a job ID "ID07" is in standby status for the next print processing. These image information are stored in correspondence with the respective job ID's.

In the first embodiment, the print job management table in the digital copying machine 1 is rewritten. Next, a second embodiment will be described as a case where a print job management table in the printer server PS is rewritten.

In the second embodiment, as the print mode change is performed in the printer PS, as long as the printer server PS has not sent data to the digital copying machine 1 and deleted the data, print mode change can be performed on the print mode of a job which is currently stored on the print job management table in the printer server.

Accordingly, a copying machine which stores jobs or a copying machine which performs printing without storing jobs may be employed as the digital copying machine 1.

However, the above arrangement is especially effective in a digital copying machine without a print job management table, i.e., a copying machine which receives only one copying job or print job, and receives the next job when the current job has been completed.

As also described in the first embodiment, the printer server PS converts image information in page description language, sent from the client computers CC1 to CC4, into bitmapped data acceptable for the digital copying machine 1.

The converted data is temporarily stored in the hard disk of the printer server PS, and when the digital copying machine 1 can receive the data, the data is read from the hard disk and forwarded to the digital copying machine 1.

Accordingly, the data is managed by the printer server by the time when the digital copying machine 1 can receive the data.

For the purpose of data management, the printer server PS has a print job management table similar to that described in the first embodiment. By rewriting this management table, the print mode of the stored job can be changed on the printer server.

The print mode change subroutine according to the second embodiment starts when a current job of the printer server PS is displayed. It can be considered that substantially the image of the operation panel OP in FIG. 13 is displayed on a display of the printer server PS.

Figure 18A:
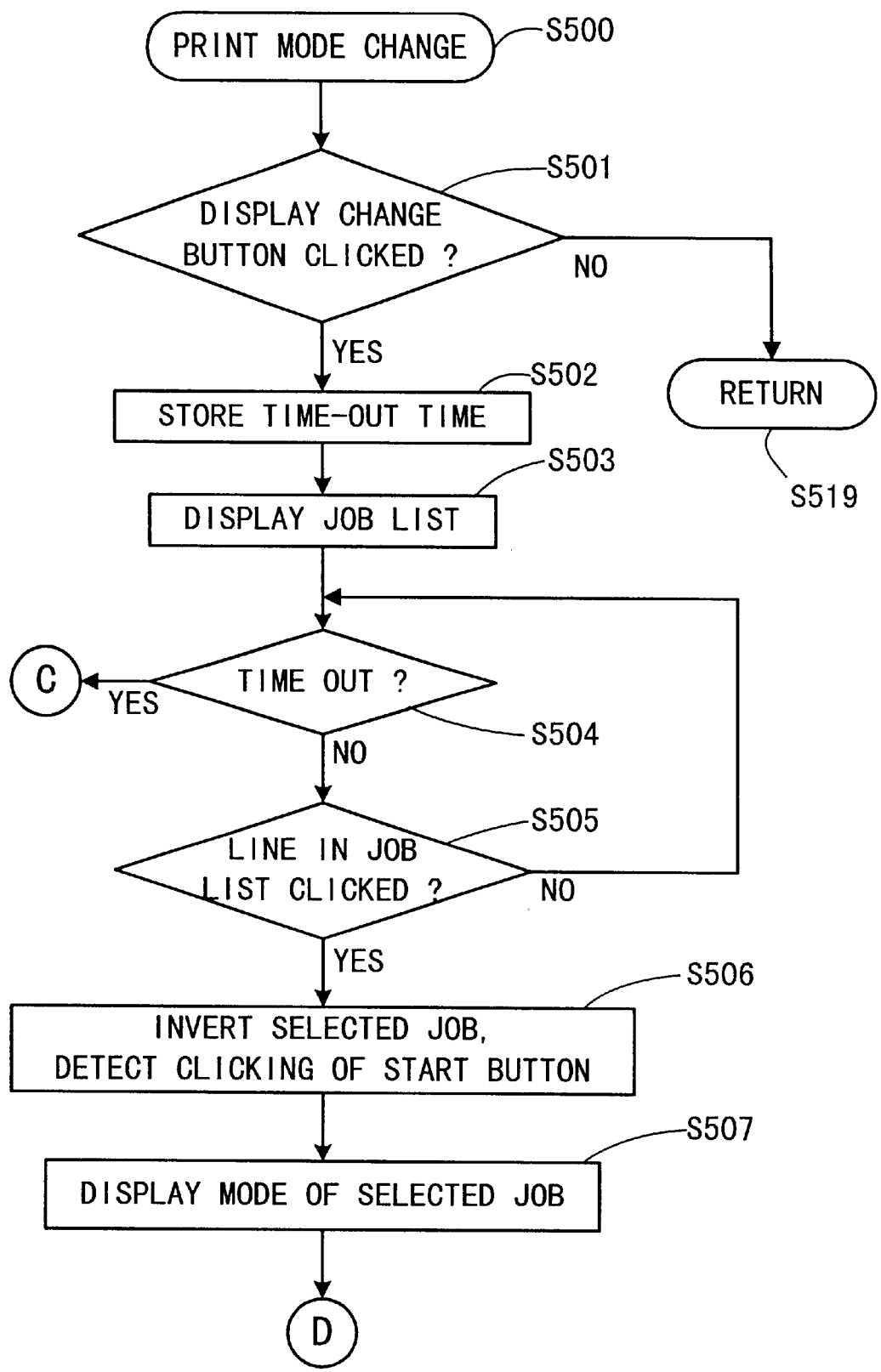
FIGS. 18A and 18B are detailed flowcharts of the subroutine "print-mode change" (step S209) in the flowchart of FIG. 9, according to another embodiment of the present invention.
Figure 18B:
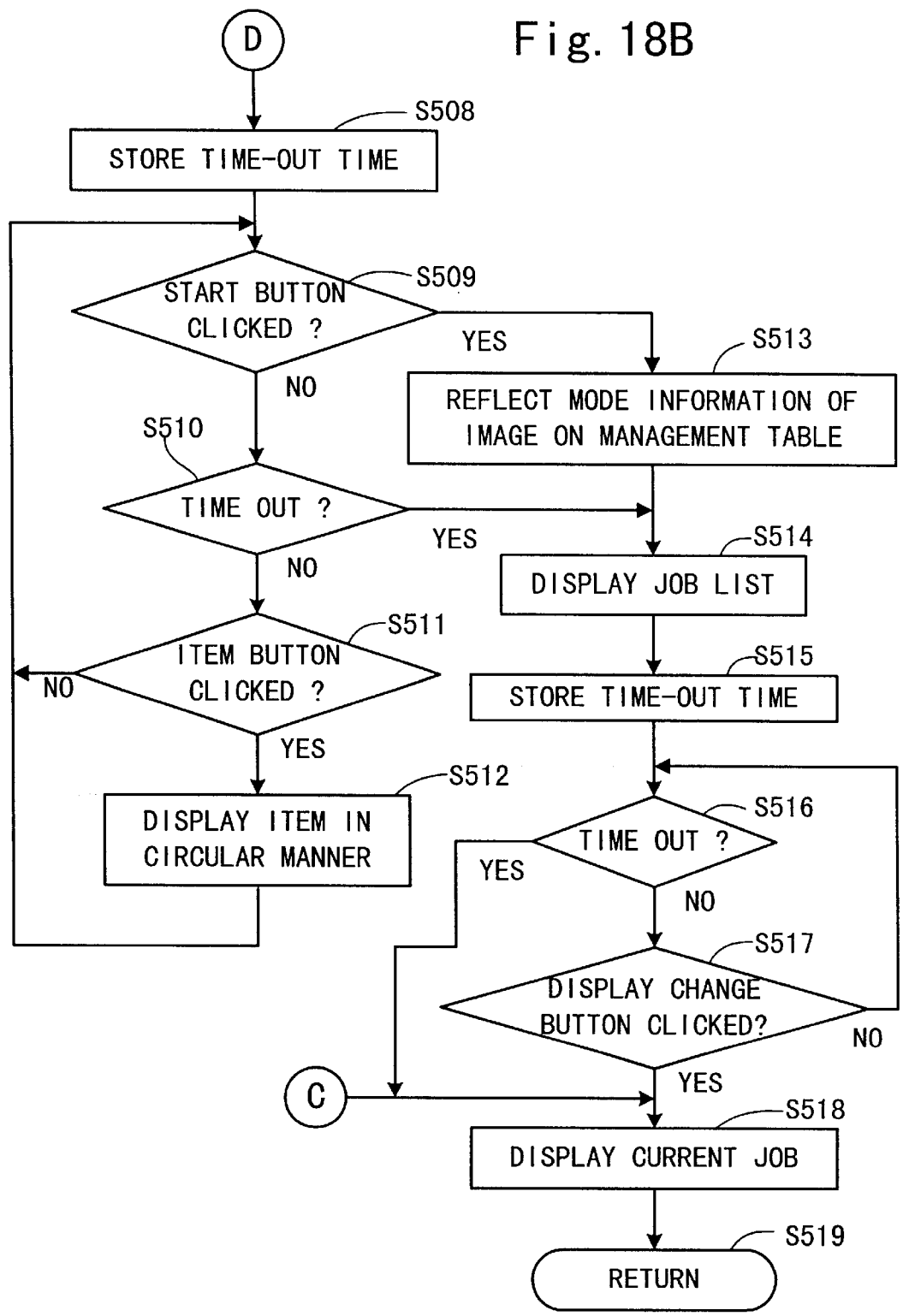

FIGS. 18A and 18B are flowcharts showing the print-mode change subroutine according to the second embodiment. The flowchart of FIG. 18A and FIG. 18B are substantially the same as that of FIG. 12A and FIG. 12B, however, in case of the print mode change on the printer server, the depression of keys and touching the touch panel in the flowchart of FIG. 12A and FIG. 12B are made by clicking with a mouse. Accordingly, the operation of the keys and touch panel are clicking button images on the displayed image.

Further, as it is generally assumed that the printer server PS does not have an independent general hardware timer, the present embodiment realizes a timer function by reading the value of a clock included in the printer server.

In this embodiment, for this purpose, the processing as timer setting in FIG. 12A and FIG. 12B is storing time, obtained by calculating a present time and necessary period, as time-out time. The determination of time-out status is made by comparing a newly read present time with the stored time-out time. If the present time is past the time-out time, the time-out status is determined.

Since the operation of the second embodiment is not substantially different from that of the first embodiment except the above points, the operation of this subroutine has been substantially described in the first embodiment. Accordingly, description of the operation of the second embodiment will be omitted.

Note that in FIG. 18A and FIG. 18B, the respective steps are numbered with numerals from 500 to 519, each having a tenth and unit digits (i.e., "00" to "19") corresponding to those in the step numbers in FIG. 12A and FIG. 12B.

In the first embodiment, the standby period is set, and during the set period, the print mode immediately before the execution of printing can be changed. This function may be omitted.

Note that in this case, the print mode change is only possible with respect to a print job or copying job in the job management table.

For this modification, it is arranged such that in the flowchart of FIG. 10, the process jumps from step S301 to step S311, and the routine therebetween (steps S302 to S310) is deleted.

In the first embodiment, if the function to change a print job or copying job in the job management table is not necessary, or if a digital copying machine which cannot store jobs is employed, it may be arranged such that the copying machine has only the function to change the print mode immediately before the execution of printing.

Figure 19:
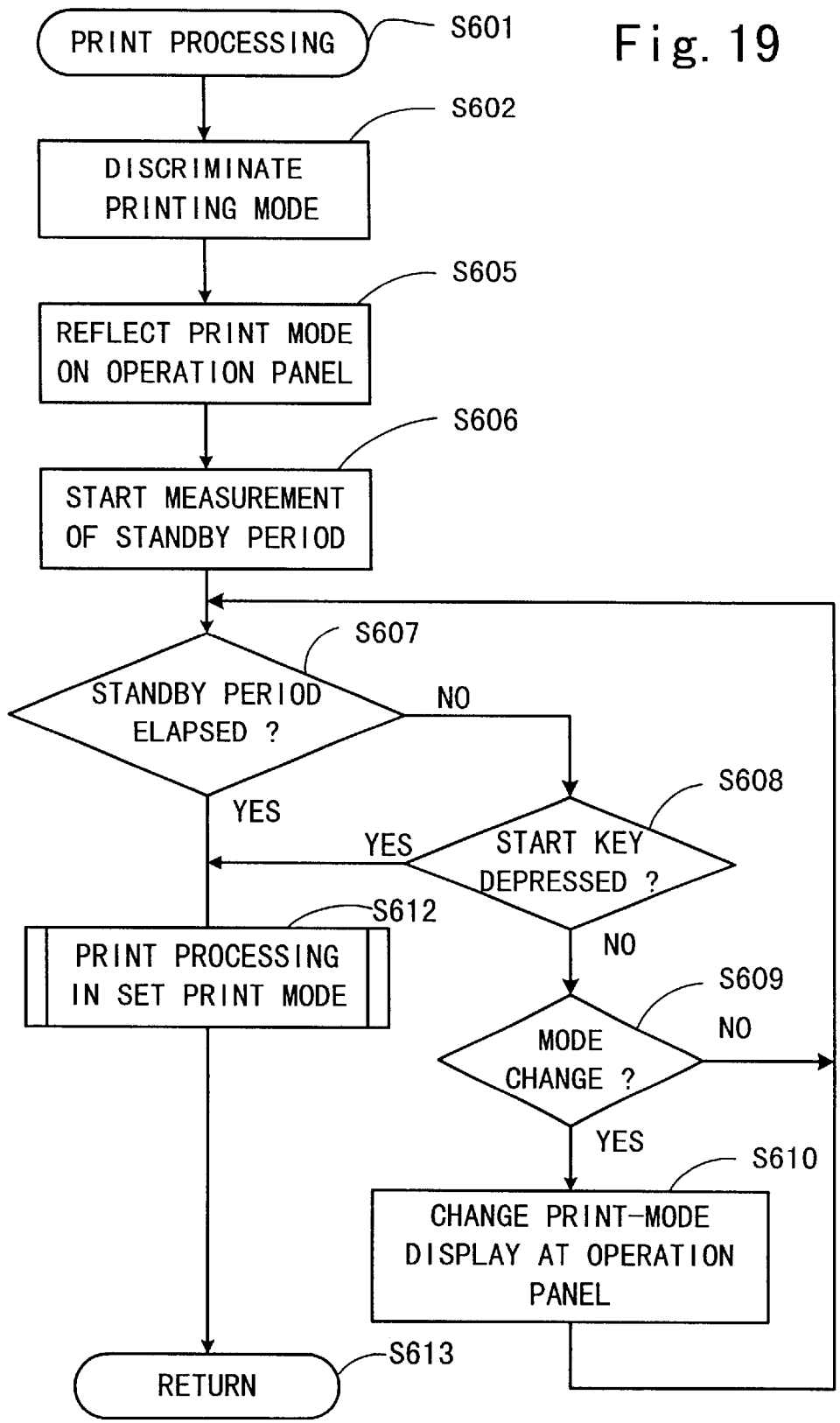
FIG. 19 is a flowchart showing another embodiment where a print standby period is set at the digital copying machine which does not have the job management table, and mode change is performed during the set print standby period.

In this case, as the subroutine of FIG. 12 is unnecessary, step S209 in FIG. 9 is deleted, and the print processing subroutine (step S207) in FIG. 9 is arranged as shown in FIG. 19.

When the print processing subroutine is started (step S601), the print mode is discriminated (step S602). The discriminated print mode is displayed on the display 804 of the operation panel OP (step S605). Then a timer is set to a standby period, and time measurement is started (step S606).

If the standby period has elapsed (YES at step S607), or the depression of the start key 802 is detected (YES at step S608), print processing is performed in the set print mode (step S612). Then the process ends (step S613).

Further, if the standby period has not elapsed (NO at step S607), and the depression of the start key 802 is not detected (NO at step S608), it is checked whether or not the print mode has been changed at the operation panel OP (step S609). If the mode change has been made, that status is displayed on the operation panel OP, and the print mode is changed as displayed on the operation panel OP (step S610).

Then, it is again checked whether or not the standby period has elapsed, and these operations are repeated. When the standby period elapses or the depression of the start key 802 is detected, the process proceeds to the above-described step S612. Then the subroutine ends (step S613).

According to the present invention, having the construction as recited in the appended claims, the printer functions can be set on the operation panel of the printer also for printing using the printer driver although printer functions to be used cannot be set with the printer driver, and so the performance of the printer can fully be used, effectively enabling efficient printing; or, after printing is required from a printer driver and before an object printer starts printing, addition/change of mode settings such as execution/non-execution of sorting, execution/non-execution of stapling, execution/non-execution of punching, as well as the size of a print sheet, the number of pages, a paper-feed port, can be made with respect to a job in printing queue, without changing the printing order, at an operation panel or a printer server.

Accordingly, in a case where an operator has issued a print request, if the operator wants to change the mode of the printing, he/she can perform change/addition of the print mode by operating the printer or the printer server. Further, this reduces the load on the system due to retransmission of print request.

As many apparently widely different embodiments of the present invention can be made without departing from the spirit and scope thereof, it is to be understood that the invention is not limited to the specific embodiments thereof except as defined in the appended claims.

What is claimed is:

1. An image processing system having an external terminal and an image forming apparatus, said external terminal comprising:

a mode-information setting unit setting mode information for image information; and a transmission unit transmitting the image information and the mode information, and said image forming apparatus comprising:

a reception unit receiving the image information and the mode information;

a memory storing the image information and the mode information received by said reception unit, in correspondence with each other;

an external operation unit inputting additional mode-information that cannot be set with the mode-information setting unit; and an image formation unit forming an image on a print sheet, based on the image information, the mode information stored in said memory, and the additional mode information.

2. An image processing system according to claim 1, wherein said image formation unit stands by for a predetermined period for mode information change, before said image formation unit forms the image.

3. An image processing system according to claim 1, wherein said operation unit adds in format ion indicative of execution or non-execution of sorting, as mode information, to the mode information stored in said memory.

4. An image processing system according to claim 1, wherein said operation unit adds information indicative of execution or non-execution of stapling, as mode information, to the mode information stored in said memory.

5. An image processing system according to claim 1, wherein said operation unit adds information indicative of execution or non-execution of punching, as mode information, to the mode information stored in said memory.

6. An image processing system having an external terminal, a printer server and an image forming apparatus,
said external terminal comprising:
a mode-information setting unit setting mode information for image information; and
a first transmission unit transmitting the image information and the mode information,
said printer server comprising:
first reception unit receiving the image information and the mode information transmitted from said external terminal via said first transmission unit;
a memory storing the image information and the mode information received via said first reception unit, in correspondence with each other;
a mode-information change unit changing the mode information stored in said memory; and
a second transmission unit transmitting the image information and the mode information stored in said memory to said image forming apparatus,
and said image forming apparatus comprising:
a second reception unit receiving the image information and the mode information transmitted from said printer server via said second transmission unit; and
an image formation unit forming an image on a print sheet, based on the image information and the mode information received by said second reception unit.

7. An image processing system according to claim 6, wherein said mode-information change unit adds additional mode information, sent from an external device, to the mode information stored in said memory.

8. An image processing system according to claim 7, wherein said additional mode information is mode information that cannot be set with the mode information setting unit.

9. An image processing system according to claim 6, wherein said image formation unit stands by for a predetermined period for mode information change, before said image formation unit forms the image.

10. An image forming apparatus, comprising:
a reception unit receiving image information and mode information transmitted externally;
a memory storing the image information and the mode information received by said reception unit, in correspondence with each other;
an external operation unit inputting additional mode information that cannot be set with the mode-information setting unit; and
an image formation unit forming an image on a print sheet, based on the image information, the mode information stored in said memory and the additional mode information.

11. An image forming apparatus according to claim 10, wherein said image formation unit stands by for a predetermined period for mode information change, before said image formation unit forms the image.

12. A printer server, comprising:
a reception unit receiving image information and mode information transmitted externally;
a memory storing the image information and the mode information received by said reception unit, in correspondence with each other;
a mode-information change unit changing the mode information stored in said memory; and
a transmission unit transmitting the image information and the mode information stored in said memory to an image forming apparatus.

13. A printer server according to claim 12, wherein said mode-information change unit adds additional mode information, sent from an external device, to the mode information stored in said memory.

14. A printer server according to claim 13, wherein said additional mode information is mode information that cannot be set with the external device.

15. A printer server according to claim 12, wherein said image forming apparatus stands by for a predetermined period for mode information change, before said image forming apparatus performs image formation.

16. An apparatus connected to a printer, comprising:
a reception unit receiving image information and mode information sent externally;
a memory storing the image information and the mode information received by said reception unit, in correspondence with each other;
a mode-information change unit transmitting the image information and the mode information stored in said memory to an image forming apparatus.

17. A recording medium having a program which is loaded onto a printer server or a device connected to a printer, said program performing:
receiving image information and mode information sent externally;
storing the image information and the mode information received, in correspondence with each other;
changing the mode information stored by said memory; and
transmitting the image information and the mode information stored by said memory to an image forming apparatus.

18. An image forming method, comprising:
transmitting image information and mode information corresponding to the image formation, from a terminal device;
receiving the image information and the mode information and storing the image information and the mode information, in an image forming apparatus;
adding additional mode information that cannot be set with the terminal device to the mode information stored in said image forming apparatus by using an external operation unit thereof; and
printing an image from said image forming apparatus on a print sheet, based on the image information and the mode information to which the additional mode information has been added and stored in said image forming apparatus.

19. An image forming method, comprising:
transmitting image information and mode information corresponding to the image information, from a terminal device;
receiving the image information and the mode information and storing the image information and the mode information, in a printer server;
performing change or addition on the mode information stored in said printer server;
transmitting the image information and the mode information where the change or addition has been performed, stored in said printer server, to an image forming apparatus; and
printing an image from said image forming apparatus on a print sheet, based on the image information and the mode information received by said image forming apparatus.

20. An image forming apparatus, comprising:

an external terminal transmitting image information and mode information;

a printer server receiving and storing the image information and mode information, and changing the mode information; and an image apparatus forming an image on a print sheet, based on the image information and the mode information.

21. An image processing system, comprising:

an external apparatus, comprising:
- a mode-information setting unit setting mode information for image information, and
- a transmission unit transmitting the image information and the mode information; and an image forming apparatus, comprising:
- a reception unit receiving the image information and the mode information transmitted by said transmission unit,
- an external operation unit setting at least one of a sorting mode information, a stapling mode information, and a punching mode information, and
- an image forming unit forming an image on a sheet based on the image information with the mode information set by the operation unit.

* * * * *

UNITED STATES PATENT AND TRADEMARK OFFICE
CERTIFICATE OF CORRECTION

PATENT NO. : 6,614,546 B1
DATED : September 2, 2003
INVENTOR(S) : Yoshiharu Kurozasa It is certified that error appears in the above-identified patent and that said Letters Patent is hereby corrected as shown below:

<u>Title page,</u>
Item [57], ABSTRACT,
Line 14, change "on" to -- one --

<u>Column 14,</u>
Line 56, change "in format ion" to -- information --,

<u>Column 15,</u>
Line 9, before "first", add -- a --.

Signed and Sealed this

Thirteenth Day of January, 2004

JON W. DUDAS
*Acting Director of the United States Patent and Trademark Office*